United States Patent [19]

Lepinski

[11] Patent Number: 5,549,029
[45] Date of Patent: Aug. 27, 1996

[54] METHOD FOR OPERATING A MUSICAL INSTRUMENT

[76] Inventor: Jerald L. Lepinski, 25331 Ridge Way, Golden, Colo. 80401

[21] Appl. No.: 404,053

[22] Filed: Mar. 14, 1995

Related U.S. Application Data

[63] Continuation-in-part of Ser. No. 4,834, Jan. 19, 1993, abandoned.

[51] Int. Cl.$^6$ .................................................. G09B 15/08
[52] U.S. Cl. ............................................... 84/483.2; 84/478
[58] Field of Search ............................ 84/423 R, 470 R, 84/478, 483.2

[56] References Cited

U.S. PATENT DOCUMENTS

| | | | |
|---|---|---|---|
| 104,393 | 6/1870 | Wright | 84/483.2 |
| 733,351 | 7/1903 | Beswick | 84/483.2 |
| 828,020 | 8/1906 | Davis | 84/483.2 |
| 832,406 | 10/1906 | Naunton | 84/483.2 |
| 881,085 | 3/1908 | Shires | 84/483.2 |
| 885,192 | 4/1908 | Smith | 84/483.2 |
| 1,004,215 | 9/1911 | Stringfield | 84/483.2 |
| 1,313,015 | 8/1919 | Reeve | 84/483.2 |
| 1,356,416 | 10/1920 | Taft | 84/483.2 |
| 1,415,396 | 5/1922 | Reeve | 84/483.2 |
| 1,424,718 | 8/1922 | Fee | 84/483.2 |
| 1,473,495 | 11/1923 | Miller | 84/483.2 |
| 1,483,380 | 2/1924 | Reeve | 84/483.2 |
| 1,539,308 | 5/1925 | Faunt | 84/483.2 |
| 1,551,819 | 9/1925 | Glisson | 84/483.2 |
| 1,594,194 | 7/1926 | Burgess | 84/483.2 |
| 2,406,946 | 9/1946 | Firestone | 84/423 |
| 3,331,271 | 7/1967 | Glenn | 84/478 |
| 3,698,277 | 10/1972 | Barra | 84/483 |
| 3,700,785 | 10/1972 | Leonard | 84/470 |
| 3,741,066 | 6/1973 | Cromleigh | 84/478 |
| 4,054,079 | 10/1977 | Sohler | 84/423 |
| 4,277,090 | 7/1981 | Lusi | 284/47 |
| 4,434,698 | 3/1984 | Oberlander | 84/483 |
| 5,052,265 | 10/1991 | Henry | 84/483 |

FOREIGN PATENT DOCUMENTS

WO94/17506  8/1994  WIPO.

OTHER PUBLICATIONS

Reed, Thomas S., First MMMA Conference Proceedings, First International Conference of the Music Notation Modernization Association, Norwich, England, 1988, p. 75 (MMMA 1991).
Reed, Gardner, Source Book of Proposed Music Notation Reforms, Greenwood Press, pp. 14–23, 42–45, 50–53, 58–81, 90–101, 104–105, 126–127, 164–171, 180–182, 188–189, 200–203, 214–217, 221–222, 226–227, 326–327, 350–353, 400–413, 424–455 (N.Y. 1987).
Lepinski, Music Staff 1, (1985).
Lepinski, Music Staff 2, (1985).

*Primary Examiner*—Patrick J. Stanzione
*Attorney, Agent, or Firm*—Sheridan Ross & McIntosh

[57] ABSTRACT

The present invention provides a method for operating a musical instrument, especially a keyboard instrument such as a piano. In one embodiment, a keyboard instrument is provided which is operable for producing a musical sound. The keyboard instrument is used in combination with a musical staff on which a musical composition has been recorded. The staff has a structure that corresponds with the arrangement of keys on a keyboard such that notes recorded in spaces on the staff correspond to white keys of the keyboard instrument and notes recorded on lines correspond to black keys of the keyboard instrument. The keyboard instrument is operated by depressing the appropriate corresponding white key for a note recorded on a space of the staff and depressing the appropriate black key for a note recorded on a line of a staff.

15 Claims, 9 Drawing Sheets

METHOD FOR OPERATING A MUSICAL INSTRUMENT

CROSS-REFERENCE TO RELATED APPLICATION

This application is a continuation-in-part of U.S. patent application Ser. No. 08/004,834 entitled "System of Musical Notation" filed on Jan. 19, 1993, which is now abandoned.

FIELD OF THE INVENTION

This invention relates to a method for operating a musical instrument to produce sounds corresponding to a musical piece. The method is particularly useful for identifying and activating the appropriate keys of a keyboard instrument, such as a piano.

BACKGROUND OF THE INVENTION

Musical sounds have been produced for hundreds of years by musicians operating musical instruments by reading music from a conventional music staff and manipulating the musical instrument to create sound corresponding to the music represented on the musical staff. According to the conventional music notation system currently in use, symbols are placed on a series of parallel, horizontal lines, called a staff, to depict tones of the music being visually recorded. The conventional staff consists of five uniformly spaced, horizontal lines and the intervening spaces. Graphic symbols, often referred to as notes, are positioned on the staff on a line, in a space between two lines, in the space immediately above the top line, and in the space immediately below the bottom line. Additional notes can be shown above or below the described position by the use of ledger lines, which are used to show how far up, or down, the note is. Counting ledger lines can be a serious problem, adding confusion to the process of reading music, for both the novice and the experienced musician or vocalist.

Clefs are graphic characters placed on the staff to locate the position of a note that represents a specific pitch. The positions of other notes representing other pitches are then determined relative to the fixed note. The most common clefs are the bass (indicating that the fourth line from the bottom is "F below middle C") and the treble clef (indicating that the second line from the bottom is "G above middle C"). The "C" clef is used on any of the first four lines to indicate the location of "middle C" and becomes the soprano clef, the mezzo soprano clef, the alto clef or the tenor clef, respectively. The "C" clef is used to minimize the number of ledger lines that would be needed for a given piece that would be encompassed by the ranges served by the bass or treble clefs.

Notes are placed on the staff to show both the pitch and the rhythmic or durational value of the represented tone. The note has a notehead, being the body of the note. The position of a notehead on the staff indicates the pitch of the represented tone, and especially the pitch relative to the pitch of the note fixed in position by the clef. The conventional notehead has a generally rounded shape that appears somewhat elliptical. The rhythmic value of the represented tone is indicated by the relative size of the notehead, whether the notehead is blackened or unblackened, and by adding additional symbolization such as stems and flags.

One problem with the conventional notation system is that the conventional staff is used to serve a greater range than the approximate octave and a half it can easily represent, including the use of clefs and ledger lines. To increase the number of pitches available in the staff, a system of key signatures and "accidentals" is used. A group of flats or sharps characters, referred to as key signatures, is placed at the left end of the staff, immediately to the right of the clef, to indicate the set of pitches that comprise the predominant scale. "Accidental" markings are then placed to the left of the noteheads to indicate temporary alterations of the basic scale. Therefore, a notehead located at any given position on the staff could represent more than one pitch. This anomaly in conventional music notation is a historical accident and contributes to confusion in reading music from a conventional staff.

For example, the standard keyboard instrument, such as a piano, contains eighty-eight keys. Each key represents a different pitch. Twelve pitches, represented by twelve consecutive keys, make up an octave. Therefore, the standard keyboard contains keys representing seven octaves plus four additional pitches. The twelve pitches within any octave are represented by a group of seven white keys and five black keys, beginning with the noted named "C" and ending with the note named "B." In conventional notation, insufficient space has been allocated on the staff to accommodate a separate position for each of the twelve pitches in an octave. Therefore, the black keys are generally represented using key signature marks or "accidentals," indicating sharps or flats. The use of key signature and "accidentals" is inherently complex.

Confusion is further added by the fact that a note representing a given pitch that appears on a line in one octave, will appear in a space in the next higher or lower octave, and so forth, thereby constantly altering its appearance. Therefore, the musician cannot with complete ease distinguish a pitch by its location on a conventional staff. Complexity in the conventional system is also added because, for the top twenty five or so pitches of a standard keyboard beginning with about "high C," and for the bottom sixteen or so pitches beginning with "low C," notes represented on a conventional staff must include such a large number of ledger lines for representation that musicians commonly get confused, and in some cases, are forced to stop and count them.

From the foregoing, it can be seen that an operator of a musical instrument using conventional music notation is required to process a significant amount of information using a difficult system in order to produce a musical sound from the musical instrument.

The problems with using conventional notation with musical instruments have long been recognized. Some attempts have been made to provide improvements.

For example, U.S. Pat. No. 104,393 by Wright issued Jun. 14, 1870 proposed the use of a staff having alternating groups of two and three lines with wider spaces between groups than between lines within groups. The lines would correspond to black keys on a keyboard and the spaces would correspond to white keys on a keyboard. Several alternating groups of two and three lines could be used to accommodate multiple octaves of interest for any particular piece of music.

Joseph Matthias Hauer, Report of the First Conference of the Music Notation Modernization Association, 1988 (July 1991), presents a "Zwöftonschrift" (twelve tone script) that is the staff disclosed by Wright, but having conventional notation drawn on it.

Several problems, however, exist with the staff proposed by Wright, and the use of conventional notation on that staff as proposed by Joseph Matthias Hauer.

First, and foremost, although the conventional staff and notation on the staff are awkward, use of the conventional system is deeply ingrained in the music profession. A multitude of music has been written using the conventional system and practitioners are familiar with the system. There is a tremendous amount of momentum to retain the conventional system.

The repeating group of alternating two and three lines proposed by Wright is similar enough to the standard staff consisting of five lines that a musician could easily confuse the staff for a conventional staff. In such a case the musician trained to use a conventional staff would not be benefitted by the use of Wright's staff. The potential for confusing Wright's staff with the conventional staff is amplified by the use of conventional notation as proposed by Joseph Matthias Hauer. The unwary musician who is concentrating on translating written music during reading may confuse Wright's staff with the conventional system.

Second, the staff proposed by Wright is awkward. For example, for a piano composition that crosses several octaves, many alternating groups of two and three lines would be required to show all of the notes. Reading music from such a large number of staff lines could be just as awkward and confusing as dealing with large numbers of ledger lines used in the conventional system.

Third, the Wright scale requires that the musician must adjust to the visual movement up or down across twelve positions on the staff of Wright to accomplish the same change in pitch accomplished by moving up or down only seven positions on the conventional staff. Therefore, the musician who is used to the conventional notation system could become confused when attempting to read music from the staff of Wright.

A need exists for an improved method for operating a musical instrument to produce musical sounds which avoids the awkwardness and complexity involved with using the conventional notation system.

SUMMARY OF THE INVENTION

The present invention provides a method for operating a musical instrument to produce a sound in which a new music notation system is used to provide an easily identifiable correspondence between the music notation and the musical instrument being operated, especially when the musical instrument is a keyboard instrument, such as a piano.

In one embodiment, a keyboard instrument is provided having both black and white keys, such as would be found on a standard piano keyboard. A staff is provided with lines corresponding to black keys and spaces corresponding to white keys. A musical composition is shown on the staff by noteheads located on a line and/or in a space of the staff. Two lines of the staff are wider than other lines of the staff, so that a musician reading the staff is immediately oriented to the positioning of notes within an octave and so that the staff is easily distinguished from a conventional staff, thereby reducing possible confusion with a conventional staff. To produce a musical sound from the keyboard instrument, the corresponding black key is depressed when a notehead on the staff is positioned on a line of the staff and the corresponding white key is depressed when a notehead on the staff is positioned in a space.

The present invention permits even nonmusicians to operate a keyboard instrument to produce sounds corresponding to a music composition which has been recorded on the staff. The person need not be instructed in music and need not exercise any artistic judgment in operating the musical instrument. Operation of the musical instrument involves only a simple recognition of the correspondence between the structure of the staff and the structure of the keyboard and actuation of the appropriate corresponding keys to produce the desired sounds.

In one embodiment of the present invention nonconventional noteheads are used on the staff to further avoid confusion with the conventional notation system. In one embodiment, each notehead positioned in a space on the staff has a different shape than each notehead positioned on a line. In one embodiment, a different notehead shape is provided for each notehead representing a different pitch within an octave of a musical composition.

DETAILED DESCRIPTION OF THE INVENTION

The present invention provides a new method for operating a musical instrument to produce musical sound involving music notation that considerably simplifies the recording and reading of music while avoiding unnecessary confusion with the conventional system.

In one embodiment, the present invention uses a staff designed to have positions for depicting each of twelve pitches within an octave. The staff has at least one group of two lines and one group of three lines. Multiple alternating groups of two and three lines can be used as needed. To avoid confusion with the conventional staff, however, one or more lines of the new staff are depicted in such a way that the grouping of lines appears immediately upon viewing to be different and distinct from that of the conventional staff.

Figure 1:
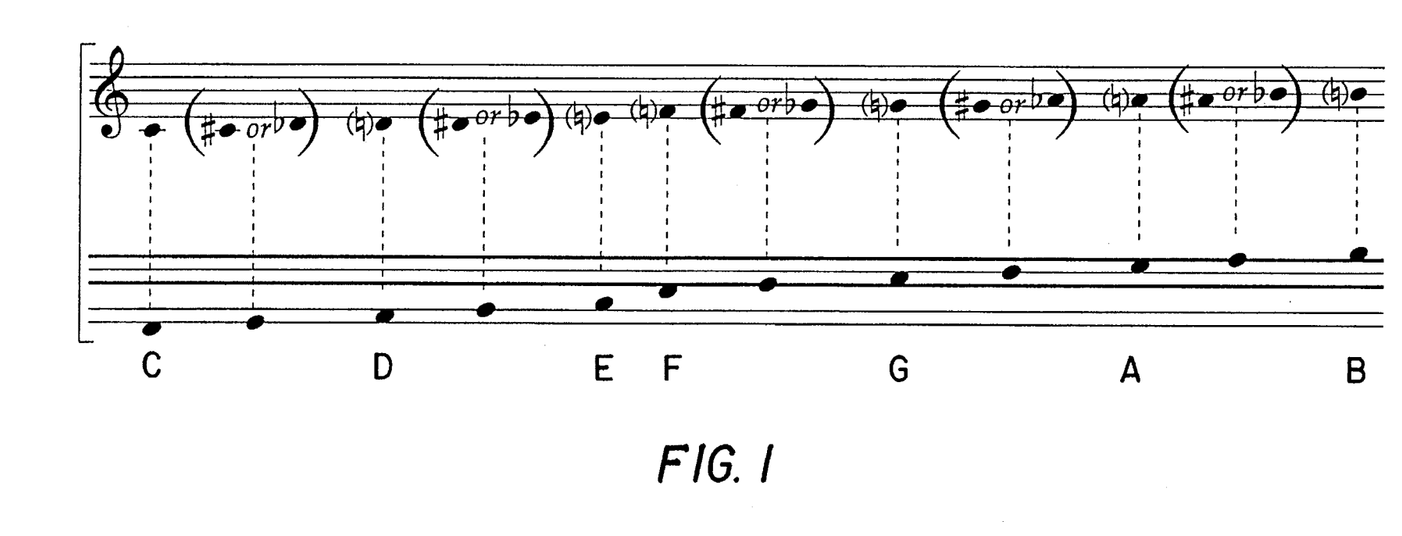
FIG. 1 shows one embodiment of a new staff of the present invention compared to a conventional staff, and showing the positioning of notes thereon.

FIG. 1 shows a conventional staff at the top and one embodiment of the new staff of the present invention at the bottom, with each staff having depicted thereon each of twelve pitches within an octave. Below the new staff, for reference purposes, is shown the letter name of the note corresponding to the represented pitch. As shown in FIG. 1, the new staff of the present invention has a group of two lines at the bottom of the staff then, moving upward, a space that is substantially larger than the space between lines of the group of two. Above the larger space is a group of three lines. Each of the three lines are separated by a smaller space, similar to separation of the lines of the group of two. The larger space between the two groups of lines is preferably about twice as wide as the space between lines within the two groups of lines.

According to a preferred embodiment of the present invention, the top line of the group of three identifies the highest pitch within any octave, that highest pitch within any octave is represented in the space immediately above that top line of a group of three lines, as shown by the placement of the notehead representing the note named "B" on the new staff of FIG. 1. The lowest pitch within any octave is identified with the bottom line of the group of two lines. That lowest pitch within an octave is represented in the space immediately below that bottom line of the group of two, as shown by the placement of the notehead representing the note named "C" on the new staff of FIG. 1.

In the particular embodiment shown in FIG. 1, the new staff is clearly, and immediately, distinguishable from the conventional staff because the outside lines of the group of three lines in the new staff have been highlighted relative to the other lines of the new staff. These two highlighted lines are shown as being both darker and wider than the other lines. Other forms of depicting lines to distinguish the new staff from the conventional staff could also be used. For example, one or more lines could be of a different color, or could have a different shape, such as being overlain by a squiggle or other identifying feature. Also, the new staff could be distinguished from the conventional staff by highlighting lines other than the two as shown in FIG. 1. However, making the two end lines of the group of three distinctive, as shown in FIG. 1, is preferred.

The utility of the new staff can immediately be seen from FIG. 1 showing noteheads depicted to identify each of the twelve pitches within an octave group. As seen, there is a particular line or space in the new staff for each of the twelve pitches, thereby avoiding the problem with the conventional staff that two different pitches can be located at the same position on the conventional staff. Also, because of the use of sharps and flats, the same pitch could appear at a different position on the conventional staff. The new staff eliminates that problem.

Furthermore, it is readily apparent from looking at the new staff where any given octave begins and ends. The same pitch within any octave will always occupy the same position relative to a group of two and a group of three lines that the corresponding pitch in another octave group would occupy. Therefore, for example, the pitch represented by the noted named "F" within any octave will always appear on the new staff by a notehead positioned immediately below and adjacent to the bottom line of a group of three lines.

As seen with the new staff in FIG. 1, notes representing pitches corresponding to the white keys on a standard keyboard are always positioned in a space, whereas notes representing pitches corresponding to black keys on a standard keyboard are always positioned on a line. As seen in FIG. 1 with the new staff, the note named "C" is located immediately below and adjacent to the bottom line of a group of two lines. The next higher pitch, generally referred to as either "C sharp" or "D flat" is located by depicting a notehead on the bottom line of the group of two. Other pitches represented by higher keys within the octave are then positioned in spaces and on lines, alternately, until the highest pitch within an octave, represented by the noted named "B," is positioned above and immediately adjacent to the top line of the group of three. The wide space between the group of two and the group of three lines allows for the placement of two noteheads, representing the notes named "E" and "F," which on a standard keyboard have no intervening black key.

As noted, each space and line on the new staff of the present invention relates to a white or black key of a keyboard instrument. Therefore, to play music, a musician would depress a white key in response to a notehead visually depicted in a space between two lines of the staff and a black key in response to a notehead visually depicted on one of the lines of the staff.

The standard keyboard instrument is ordinarily operated by a person, such as a musician, who depresses keys according to the correspondence between the noteheads visually depicted on the staff and the keys of the keyboard. Alternatively, the standard keyboard instrument could be operated by an automatic translation of the noteheads visually depicted on the staff into an actuation of the corresponding keys of the standard keyboard. For example, a staff with noteheads could be read by an optical scanner into a microprocessor. The microprocessor could be programmed to compare the position of the noteheads relative to the lines and spaces of the staff, determine the corresponding keys on the keyboard to be depressed and create an output to have the appropriate keys depressed, such as by sending signals to actuate a step motor which depresses the appropriate keys.

As an alternative to using a keyboard instrument to produce the desired musical sound, any other musical instrument could be used. The operator, or musician, would operate the instrument in a manner to produce pitches of sound corresponding with the noteheads represented in spaces and/or lines of the staff. Also, the pitches of sound could be produced using the human voice. For example, a singer could vocalize the pitches of sound corresponding to the noteheads represented in spaces and/or on lines of the staff. A singer could identify the location of noteheads on the staff and responsively produce the corresponding pitches of sound, without the complexity of interpretation required of conventional music notation. As another alternative, an electrical signal could be generated for each of the pitches represented on the staff, with the electrical signals then being converted to sound in a speaker system.

The staff of the present invention contains a position for each pitch within an octave and also provides a logical analog to the standard keyboard. Furthermore, the depiction of the new staff according to the present invention substantially facilitates the visual recording and reading of music using the new staff. At a glance, it is immediately apparent that the new staff is not the conventional staff, and confusion between the new and conventional staffs is avoided. Therefore, it is more likely that musicians accustomed to using the conventional staff will use the new staff, because confusion is minimized.

In another embodiment of the present invention, noteheads are placed on the new staff of the present invention to symbolize recorded music. Conventional noteheads can be used, as shown in FIG. 1. Preferably, however, noteheads of a different design than those of conventional noteheads are used, thereby further differentiating the new staff from the old staff, and further minimizing the possibility of confusing the new staff of the present invention with the conventional staff.

Figures 2, 3:
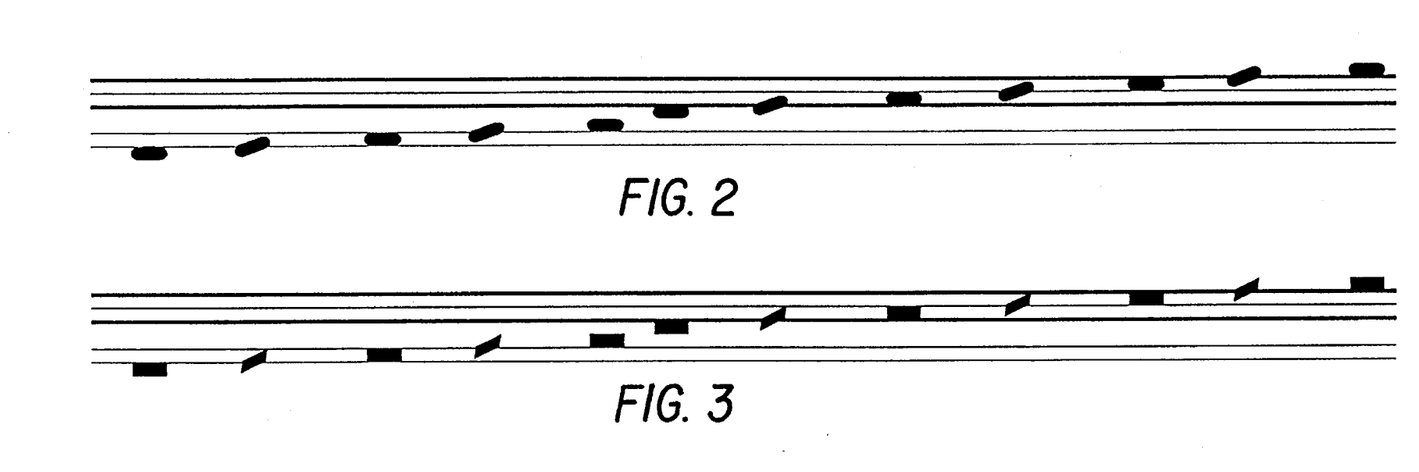
FIG. 2 shows another embodiment of the present invention using different noteheads to record pitches on lines than noteheads used to record pitches in spaces.
FIG. 3 shows another possible set of notehead designs according to the present invention.

FIG. 2 shows one embodiment wherein noteheads different than those conventionally used are placed on the new staff to record musical pitches. FIG. 2 shows an elongated notehead having rounded ends that are positioned to depict each of the twelve pitches within an octave group. Preferably, a plurality of different shaped noteheads are used to assist the musician to quickly identify the pitches to be played. In the embodiment shown in FIG. 2, the noteheads used to record pitches in a space are visually distinctive and individualized relative to those noteheads used to depict pitches recorded on a line. Therefore, a musician will immediately recognize whether the pitch is one corresponding to a white key or to a black key of a standard keyboard instrument. As used herein, placement of a notehead on a line means that the notehead is placed on the line such that the line approximately bisects the notehead, with approximately equal portions lying above and below the line. As used herein, placement of a notehead in a space means that the horizontal centerline of the notehead is placed at approximately the center of the space.

In FIG. 2, the noteheads have basically the same geometric shape, but the noteheads are placed at an angle across the line to depict pitches recorded on lines, which pitches correspond to the pitches of black keys on a standard keyboard instrument. FIG. 3 shows another embodiment using rectangular shaped noteheads to depict pitches recorded in a space of the new staff, and parallelograms that slant across the line to depict pitches recorded on a line. The embodiments shown in FIGS. 2 and 3 are illustrative only. Any other set of noteheads that distinguish between pitches recorded in spaces and on lines could be used to accomplish the same result.

Figure 4:
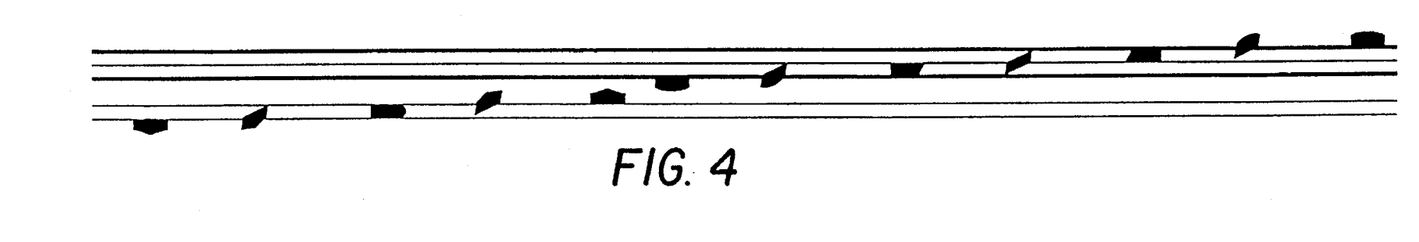
FIG. 4 shows one embodiment of the present invention using distinct, individualized noteheads for each of twelve pitches within an octave.

In one preferred embodiment, each of the pitches within an octave group is assigned a notehead design that is different and distinctive relative to the notehead design of every other pitch within an octave. FIG. 4, for example, shows one possible set of twelve graphic designs that could be used as noteheads to individualize each of the twelve pitches within an octave that could be recorded on the new staff. Therefore, in addition to the musician being aided by the unique position each pitch occupies on the new staff, the shape of the notehead further assists the musician to avoid misreading the music. Also, the notehead designs, being substantially different than conventional noteheads, will diminish the possibility that the musician will confuse the new staff of the present invention with a conventional staff.

Although FIGS. 2, 3, and 4 show different shapes of noteheads to distinguish between pitches, other methods could also be used to individualize noteheads. For example, different colors could be used for noteheads representing different pitches. Or, noteheads having a different darkness or contrast could be used to distinguish pitches.

It is also possible to alter the way in which conventional note symbols represent rhythmic values. In a preferred embodiment of the present invention, however, conventional depiction of rhythmic values is retained. Therefore, conventional rhythmic notation, such as the use of darkened and undarkened interiors of noteheads, and the use of stems and flags, is preferred.

In addition to assisting a musician to distinguish the new staff from the conventional staff and to aid the reading of visually recorded music, use of nonconventional noteheads of the present invention as previously described, can be very useful as a teaching aid. For example, a novice will benefit from the use of notehead symbols distinguishing between pitches recorded in spaces and on lines, such as shown in FIGS. 2 and 3. As a musician becomes more advanced in the use of the new system of the present invention, however, that musician may be significantly assisted by the use of twelve individualized noteheads such as shown in FIG. 4.

Figure 5:
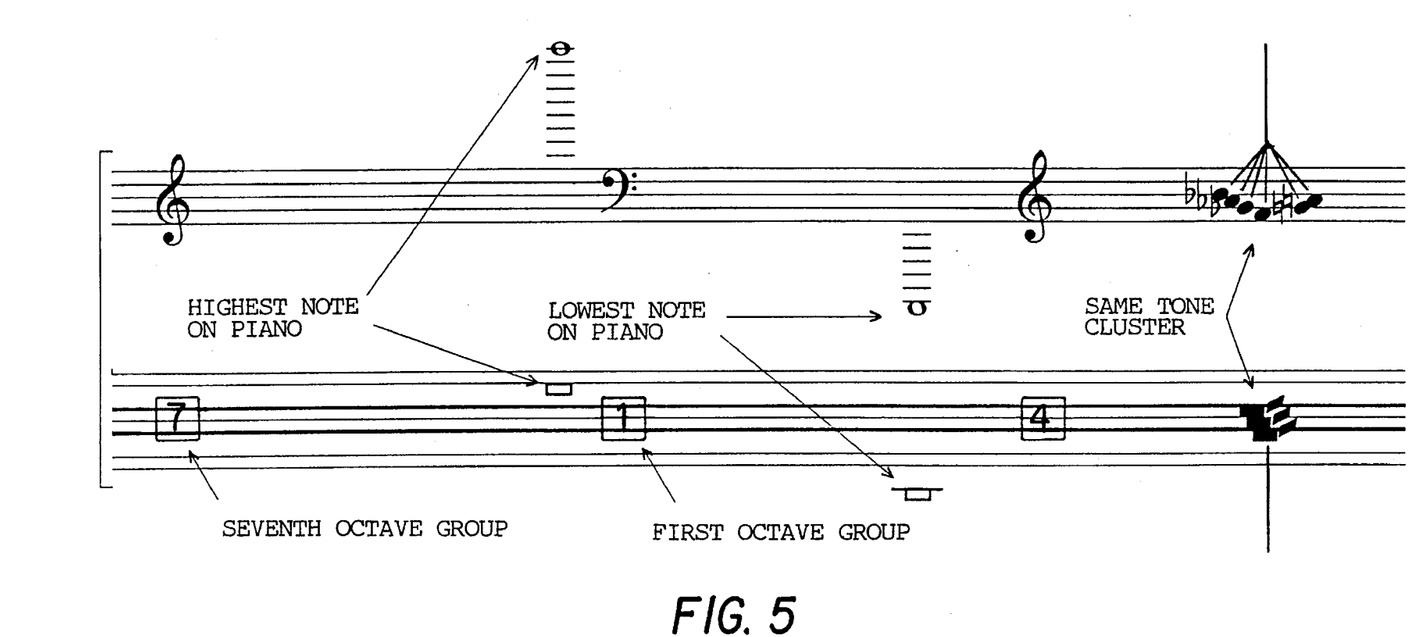
FIG. 5 shows one embodiment of the present invention wherein octave marks are used to indicate the octave in which recorded pitches occur.

As discussed previously, more lines than just one group of three and one group of two can be used with the staff of the present invention. However, it is preferred to use the minimum number of lines necessary to effectively represent the musical piece of interest. Use of an unnecessarily large number of lines can create complexity and confusion. For example, the staff of the present invention could have one group of three lines and a group of two lines above that group of three and a group of two lines below that group of three lines. By adding the extra group of two lines, additional pitches in the next higher octave can be recorded. The bottom staff in FIG. 5 shows such an embodiment of the new staff of the present invention. It should be recognized, however, that any combination of alternating groups of two and groups of three lines, or portions of groups of two and groups of three lines, can be used to indicate as many octaves, or parts of octaves, as desired. In one embodiment, the staff can comprise as few as two lines, so long as at least one line is highlighted in some fashion to orient the musician.

To avoid the complexities and confusions that result from the use of too many lines, however, in one embodiment octave marks are placed on the new staff of the present invention to indicate the octave in which the pitches are to be realized. Octave marks are any graphic symbols that can be used to specify the octave in which pitches are recorded. As a need exists to move from one octave to another for the recorded music, a new octave mark can be shown where the octave change is to take place, thereby continuously orienting the musician to the appropriate octave.

Referring to the embodiment shown in FIG. 5, octave marks are shown as placed across the group of three lines and enclosed in boxes for easy identification. The octave marks as shown are arabic numerals, however other symbols, such as Roman numerals, geometric designs, or other graphic symbols could also be used. FIG. 5 shows a conventional staff at the top and one embodiment of the new staff of the present invention at the bottom. By using octave marks, the musical notation system of the present invention avoids the use of clefs, which are shown on the conventional staff.

The use of the new staff of the present invention, combined with octave marks of the present invention, substantially simplifies the visual recording and reading of music. For example, FIG. 5 shows the placement of a note representing the highest pitch on a standard keyboard. Depicting that highest note would require the use of a treble clef and nine ledger lines above the conventional staff in conventional notation. However, the same note can be conveniently located on the new staff by indicating that the octave ending with the group of three lines is the seventh complete octave, thereby facilitating easy placement of the highest note at the position just above the end of the seventh octave group. Such a depiction is logically connected to actual placement of keys on a keyboard instrument, as previously discussed. FIG. 5 also shows, for example, the placement a note representing the lowest pitch on a standard keyboard. On the conventional staff, a base clef is required and six ledger lines below the staff. On the new staff of the present invention, however, the same note can be conveniently shown by indicating that the first complete octave of the keyboard ends with the group of three lines, with the lowest note recorded in its proper position in the octave just below that first complete octave group. The use of a single line, corresponding to a ledger line in conventional notation, has been used to conveniently depict the lowest note. However, that same note could have been located by drawing in the entire line, or an entire group of three lines in which that note is located.

As a further example of the utility of the staff of the present invention, a tone cluster is shown in FIG. 5 consisting of six individual pitches, five of which are flats or naturals, on the conventional staff as opposed to the new staff of the present invention. Also, to assist in ease of identifying the individual pitches, pitches recorded in spaces are shown using different notehead designs than those pitches visually recorded on lines. The tone cluster as shown, is played in the fourth octave of a keyboard, as noted by the octave mark on the new staff of the present invention. In addition to simplifying the recording and reading of music, the use of octave marks also further distinguishes the new staff from the conventional notation system, which uses clefs. Therefore, a musician is less likely to confuse the new staff with the conventional staff. FIG. 5 also shows the use of conventional rhythmic notation with the new staff of the present invention even though different pitch notation is used.

Figure 6:
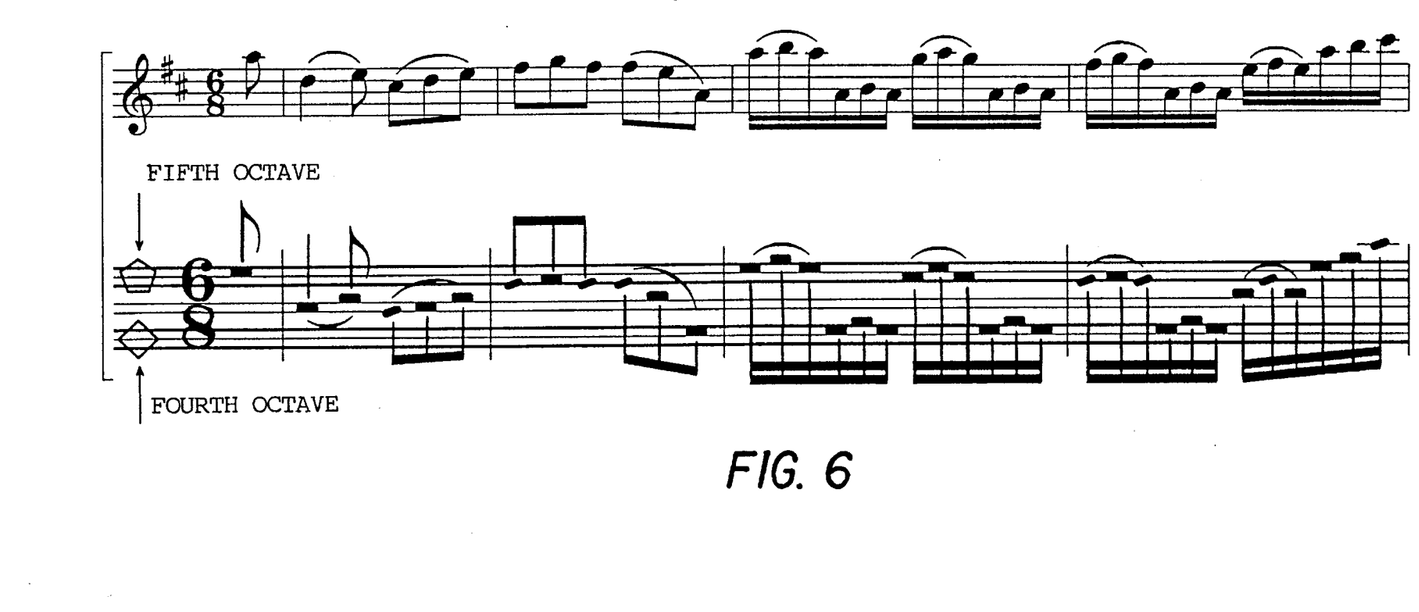
FIG. 6 shows one embodiment of the present invention having graphic symbols to indicate divisions between measures of music.

In another embodiment of the present invention, graphic symbols are placed along the new staff to indicate divisions between measures, or bars, of music. These symbols serve the same function as barlines in the conventional system. Preferably, according to the present invention, however, different symbols are used than the barlines used on a conventional staff, thereby assisting the musician to distinguish between the new staff of the present invention and the conventional staff. FIG. 6 shows the first four measures of the violin part of "Oh Thou That Tellest Good Tidings To Zion" from Händel's "Messiah" recorded in both the conventional system and the new system of the present invention. FIG. 6 shows symbols dividing measures of music as vertical lines, perpendicular to the lines of the new staff, that extend beyond the vertical extent of all lines of the new staff in each direction. Other nonconventional graphic symbols for identifying the division between measures could also be used.

FIG. 6 also shows another embodiment of the new staff of the present invention having two groups of three lines and one group of two lines. FIG. 6 further shows the use of octave marks indicating that the fifth octave and a portion of the fourth octave are shown on the new staff. The octave marks are shown as geometric figures, a pentagon and a diamond, can be used to indicate the fifth and fourth octave groups respectively. Similar geometric figures could be used to indicate other octaves.

In one embodiment of the present invention, noteheads placed on the new staff are of a size larger in proportion to spaces between lines within a group of lines than the proportion of the size of noteheads to the space between lines in the conventional system. Such larger proportioned noteheads assist the musician in identifying the proper movement up or down and make it easier for the musician to adjust from the conventional to the new system of the present invention. As discussed previously, a greater number of positions must be visually transcended using new staff to effect the same change in pitch as might be affected in fewer positional changes on the conventional staff. This effect is caused because there are an insufficient number of positions for each pitch within an octave to occupy a unique position on a conventional staff. However, by diminishing the relative size of the new staff in proportion to the size of noteheads, the visual difference of the distance to be transcended between positions is reduced, thereby aiding the musician who is accustomed to using conventional notation. Even though the movement may be a greater number of positions than on a conventional staff, the appearance will be similar because of the diminished size of the staff in proportion to the noteheads.

Figure 7:
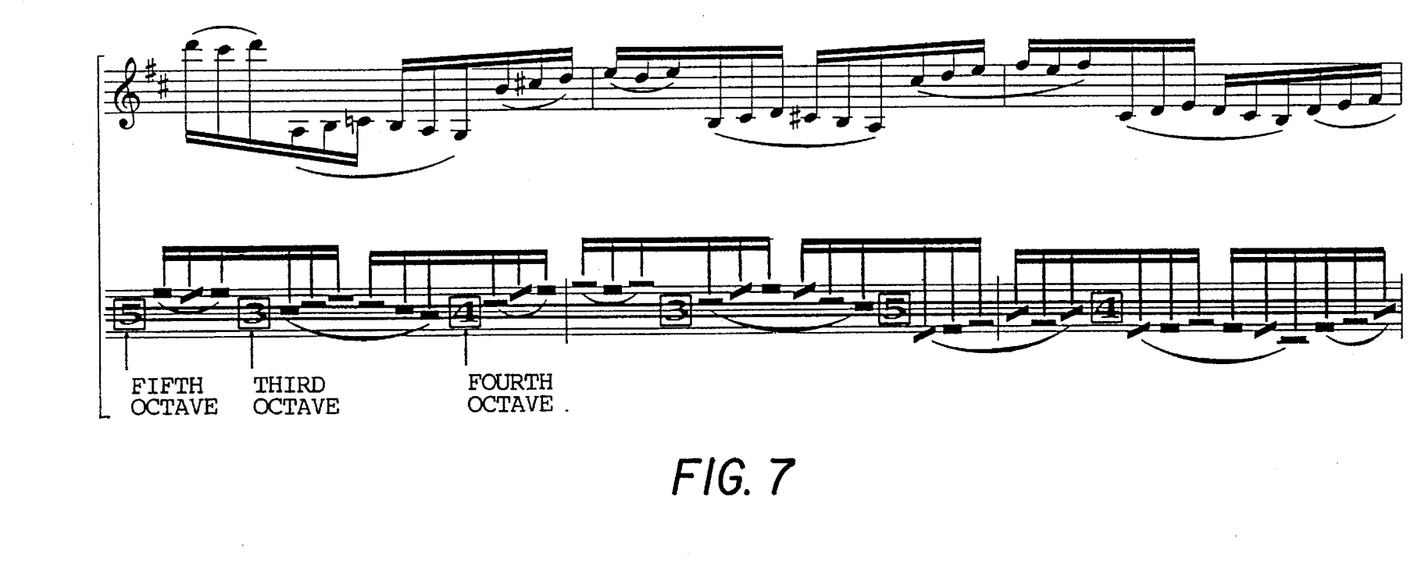
FIG. 7 shows one embodiment of the present invention having enlarged noteheads in proportion to the staff.

FIG. 7 shows a conventional staff compared with a staff of the present invention on which the next three measures of "Oh Thou That Tellest Good Tidings of Zion" are recorded. The space between lines of the new staff have been diminished and the relative proportionate size of noteheads has been increased such that, for example, a notehead to be placed in a space between lines within a group of lines actually extends slightly above and below the lines that bound that space. On a conventional system, as shown in FIG. 7, noteheads have a vertical width that is approximately the same as the space between lines of the conventional staff. By oversizing the noteheads, according to the present invention, relative to spaces between lines within a group, a visual appearance of movement between pitches becomes closer to the visual appearance using the conventional staff. FIG. 7 also shows the use of several octave marks indicating changes in octaves, thereby immediately orienting the musician to the octave group of interest. Also shown are symbols for dividing measures that are different from conventional barlines.

In one embodiment, the present invention provides a convenient system for recording music by use of the new music notation system of the present invention. The artisan recording music need not know how to read music using the conventional system to be able to record music in the new system of the present invention. Because each space and line on the new staff of the present invention relates to a white or black key, respectively, of a keyboard instrument, the artisan need only identify the proper octave, such as, for example, by the use of octave marks, and then record the key of a standard keyboard instrument that relates to the pitch to be recorded. Such a system is particularly useful for recording music in piano tablature because each space and each line of the new staff is analogous to a specific key on a standard keyboard instrument.

In another embodiment, once music has been recorded onto the new staff, such music can easily be transcribed to a conventional staff by anyone conversant in conventional music notation. Therefore, music can be recorded by an artisan who is not conversant in the conventional music notation system, and the recording can then be transcribed into the conventional notation system without great difficulty. Currently, such recordation into the conventional notation system, when an artisan lacks familiarity with the conventional system, requires that one being conversant in the conventional notation system be present with the artisan to record the music as described or as played by the artisan. Therefore, the new staff of the present invention significantly enhances the ability of artisans to record music in the conventional notation system, even when the artisan is not conversant in the conventional music notation system.

In another embodiment of the present invention, distinctive and individualized noteheads are used to distinguish pitches that relate to a white key of the standard keyboard instrument and a black key of the standard keyboard instrument. Such differences can be, for example, as previously described with respect to using different noteheads for pitches recorded on a line as compared to noteheads for pitches recorded in a space of the new staff of the present invention. However, the use of such different noteheads to identify a key having a letter designation, or the sharp or flat of a letter designation, can be used with any staff, including a conventional staff. Preferably, however, the staff is a new staff of the present invention.

Figure 8:
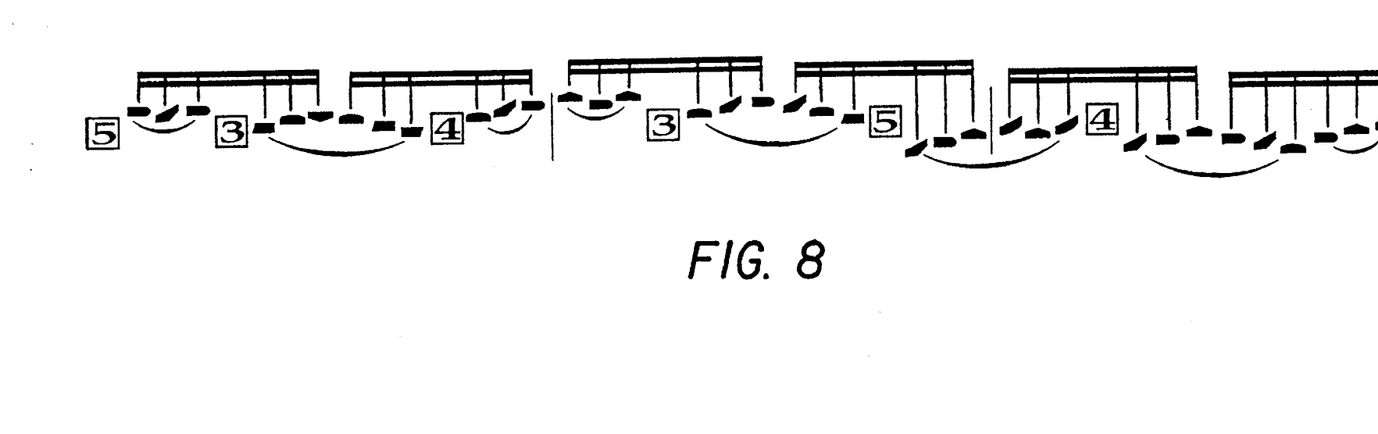
FIG. 8 shows one embodiment of the present invention having distinct and individualized noteheads for each of twelve pitches and which are shown in the absence of a staff.

Similarly, distinctive and individualized noteheads for all twelve pitches of an octave, as previously described, can be used on any staff, including a conventional staff, to facilitate the ease of reading recorded music. Alternatively, with such twelve individualized noteheads, no staff at all is required. Such might be desirable to avoid the confusion caused by the presence of unnecessary lines of a staff for the very skilled artisan who is particularly familiar with a set of notehead symbols. FIG. 8 shows the same four measures of music as shown in FIG. 7, except using individualized noteheads for each of the recorded pitches within an octave group, and in the absence of a staff.

Figure 9:
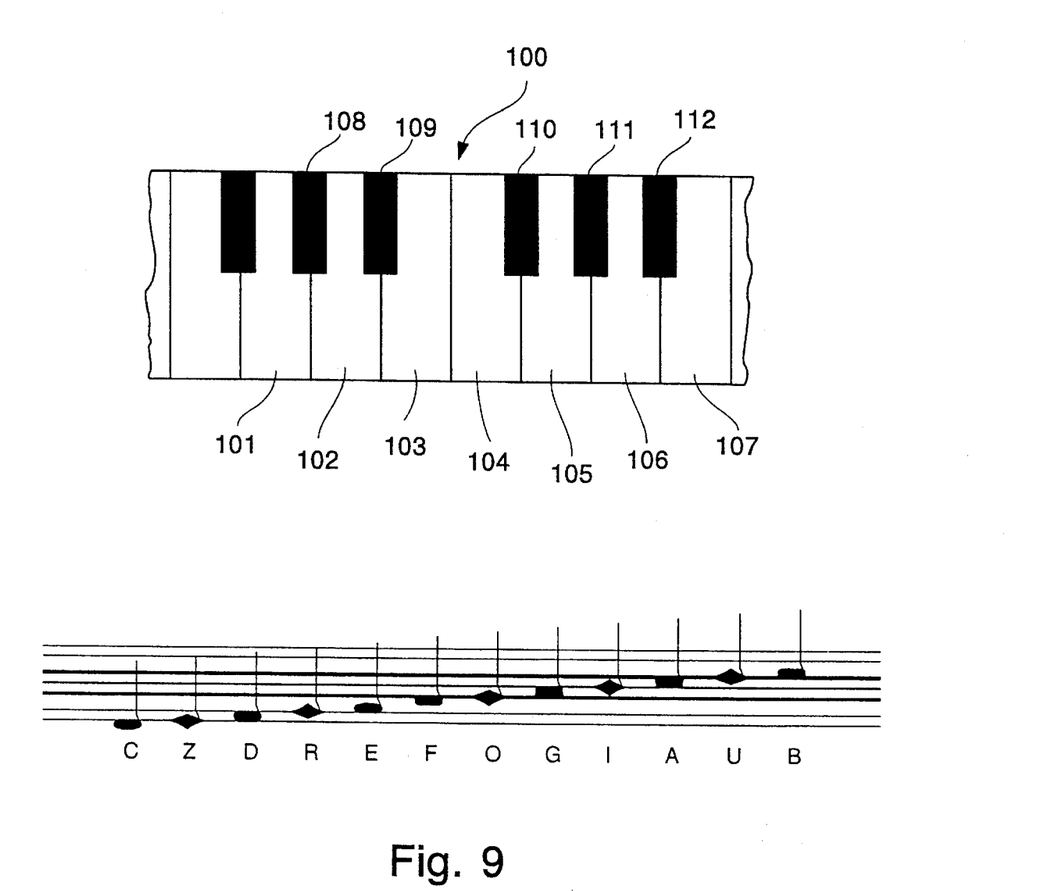
FIG. 9 shows one set of twelve noteheads, representing quarter notes, having different shapes used on a staff and shows the correspondence of the staff to a piano keyboard.

FIG. 9 shows a staff of the present invention having a preferred set of notehead designs. Each notehead, representing one of the twelve pitches within an octave, has a design that is unique and different compared to each of the other notehead designs. The notehead designs, however, are individualized in a way that communicates two helpful concepts.

First, any note that appears in a space, and therefore represents one of the seven "naturals" (white keys of the piano), is of one basic shape, with seven variations. Any note that appears on a line, and therefore represents one the of five other notes (black keys of the piano), is another basic shape, with five variations. These five other notes have been given the letter designations Z, R, O, I, and U, shown in FIG. 9.

The basic shape for the group of seven naturals is portrayed by the notehead shown for the note "D", while the notehead for the note "I" portrays the basic shape for the other five. The noteheads for the group of seven naturals are of a blocky design, having substantial thickness over the length of the notehead along the staff. The noteheads for the group of five other notes are variations of a diamond-type shape, with a relatively thick portion near the center of the notehead and tapering to points at either end of the notehead. Therefore, the general difference in shapes between the group of five and the group of seven are easily identifiable in order to assist a musician in identifying notes corresponding to white keys and notes corresponding to black keys on a piano keyboard.

Second, the two basic shapes are varied so that each notehead shape is different from all the others, while retaining the fundamental shape of its group of seven or group of five. This feature provides additional information to the musician and helps to identify the specific white key or the specific black key on the piano which corresponds to the note. Each of the group of seven is a different variation of the blocky notehead design, while each of the group of five is a different variation of the diamond-type notehead design.

Also shown in FIG. 9 is a portion of a piano keyboard 100 with white keys 101–107 and black keys 108–112, which together cover an octave on the keyboard. The correspondence between the staff shown in FIG. 9 and the keyboard 100 can be seen by noting that the space on the staff where the note "C" is positioned corresponds with white key 101; the line on which the note "Z" is positioned corresponds with black key 108; the space in which the note "D" is positioned corresponds with white key 102; the line on which the note "R" is positioned corresponds with black key 109; the space in which the note "E" is positioned corresponds with white key 103; the space in which the note "F" is positioned corresponds with the white key 104; the line on which the note "O" is positioned corresponds with the black key 110; the space in which the note "G" is positioned corresponds with white key 105; the line on which the note "I" is positioned corresponds with the black key 111; the space in which the note "A" is positioned corresponds with the white key 106; the line on which the note "U" is positioned corresponds with the black key 112; and the space in which the note "B" is positioned corresponds with the white key 107.

Figure 10:
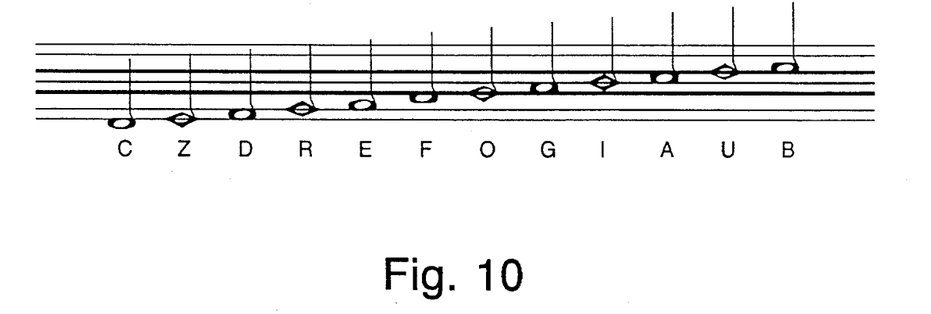
FIG. 10 shows the same twelve notehead shapes as shown in FIG. 9, except representing half notes.

Referring now to FIG. 10, a staff of the present invention is shown with 12 noteheads for the twelve pitches within an octave. These twelve noteheads have the same notehead design as those shown in FIG. 9. The noteheads in FIG. 10, however, have long, diagonal, oval holes sloping from lower left to upper right to designate, in the rhythmic scheme of traditional notation, half notes, as opposed to the quarter notes shown in FIG. 9.

Figure 11:
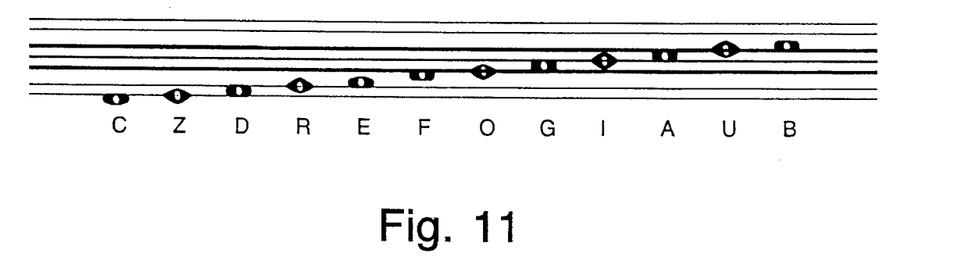
FIG. 11 shows the same twelve notehead shapes as shown in FIGS. 9 and 10, except representing whole notes.

FIG. 11 shows a staff of the present invention having 12 noteheads displayed on the staff for the twelve pitches within an octave. The noteheads shown in FIG. 11 again have the same shape as the noteheads shown in FIGS. 9 and 10, except that they are somewhat compressed to be slimmer and taller in appearance. Also, the noteheads in FIG. 10 have short, diagonal, oval holes slanting slightly from upper left to lower right in the noteheads to indicate whole notes, again following the rhythmic scheme of traditional notation.

In some musical compositions, all twelve notehead designs of any one of FIGS. 9–11 may be used. Even in simple compositions, however, at least five of the notehead designs of one of FIGS. 9–11 is used.

Also, shown in FIGS. 9–11 is a slight modification to the lines of the staff. The middle line in the group of three has a weight that is intermediate between the heavier outer lines of the group of three and the lighter lines of the group of two, further distinguishing over the conventional staff.

According to the present invention, any of the aspects of the present invention can be combined with any other aspect or combinations of aspects of the present invention. Therefore, any staff of the present invention can be combined with any noteheads or groups of noteheads, with any octave marks, with any symbols for showing divisions between measures of music or any combination thereof.

While various embodiments of the present invention have been described in detail, it is apparent that modifications and adaptations to those embodiments will occur to those skilled in the art. However, it is to be expressly understood that such modifications and adaptations are within the scope of the present invention, as set forth in the following claims.

I claim:

1. A method for operating a musical instrument to produce sound from the musical instrument, the method comprising the steps of:

provided a musical instrument comprising a keyboard having white and black keys, said musical instrument being operative for producing sound of different pitches by depressing different of said keys;

providing a visually observable staff comprising substantially parallel lines operated in two distinct and separate groups of lines, wherein a first group consists of two lines separated by a first distance and a second group consists of three lines substantially evenly spaced at a distance substantially equal to said first distance, wherein said first group and said second group are separated by a second distance that is larger than said first distance, and wherein two of the three lines of said second group have visually distinctive, individualized appearances relative to all other of said lines of both of said first group and said second group;

wherein spaces next to said lines of said staff represent a first plurality of said pitches, which correspond to pitches produced by depressing white keys of said keyboard and said lines of said staff represent a second plurality of said pitches corresponding to black pitches produced by depressing keys of said keyboard;

providing a plurality of noteheads visually depicted in any of said spaces or on any of said lines of said staff to represent pitches of a musical composition which could be produced by depressing keys of said keyboard; and depressing, on said musical instrument, keys of said keyboard corresponding to said pitches represented by said noteheads visually depicted on said staff, with a white key being depressed when a notehead appears in one of said spaces of said staff and a black key being depressed when a notehead appears on one of said lines of said staff, whereby a sound is produced by said musical instrument.

2. The method of claim 1, wherein:

said keyboard comprises a standard piano keyboard.

3. The method of claim 1, wherein:

said musical instrument is a piano.

4. The method of claim 1, wherein:

two outer lines of said three lines, of said second group of lines, are said two lines having visually distinctive, individualized appearances.

5. The method of claim 4, wherein:

said two lines having visually distinctive, individualized appearances, are wider, and, therefore more pronounced, than other lines of said group of two of said group of three.

6. A method for producing pitches of sound, the method comprising the steps of:

providing a visually observable staff comprising substantially parallel lines arranged in two distinct and separate groups of lines, such that a first group consists of two lines and a second group consists of three lines;

wherein, for said lines of said staff, a first distance is a minimum distance between one of said lines of said first group and one of said lines of said second group, a second distance is a minimum distance between said two lines within said first group, and a third distance is a minimum distance between two of said lines within said second group, with said first distance being the largest of said first distance, said second distance and said third distance; and wherein, for said lines of said staff, two of the three lines of said second group have visually distinctive, individualized appearances relative to all other of said lines of both said first group and said second group, permitting the staff to be easily distinguished from a conventional staff;

providing a plurality of noteheads visually depicted on said staff to represent pitches of a musical composition;

producing sound, responsive to said noteheads visually depicted on said staff, comprising pitches of sound corresponding to said pitches of said musical composition.

7. The method of claim 6, wherein:

the step of producing sound comprises providing a musical instrument and operating said musical instrument responsive to said noteheads visually depicted on said staff to produce pitches of sound corresponding to said pitches of said musical composition.

8. The method of claim 7, wherein:

spaces next to said lines of said staff represent a first plurality of pitches corresponding to white pitches producible by depressing keys on a standard piano keyboard and said lines of said staff represent a second plurality of pitches corresponding to black keys on a standard piano keyboard; and each of said noteheads is visually depicted as being one of said spaces or on one of said lines to provide correspondence between the position of each notehead, on said staff and the keys of a standard piano keyboard.

9. The method of claim 8, wherein:

said musical instrument comprises a keyboard having white and black keys, and wherein said step of operating said instrument comprises depressing keys on said keyboard corresponding to said pitches represented by said noteheads visually depicted on said staff;

a white key on said keyboard is being depressed when a notehead is visually depicted on said staff in one of said spaces and a black key is being depressed when one of said noteheads is visually depicted on said staff on one of said lines.

10. The method of claim 6, wherein:

two outer lines of said three lines, of said second group of lines are said two lines having visually distinctive, individualized appearances.

11. The method of claim 10, wherein:

said two outer lines of said three lines are wider than all other lines of said first group of lines and said second group of lines.

12. The method of claim 6, wherein:

a first portion of said noteheads are each depicted as being located on a line and a second portion of said noteheads are each depicted as being located in a space adjacent to a line; and each notehead of said first portion of noteheads has a distinctive appearance relative to each notehead of said second portion of noteheads.

13. The method of claim 12, wherein:

within an octave, each notehead representing a pitch of said musical composition has a different visual appearance than a notehead representing any other pitch of said musical composition.

14. The method of claim 13, wherein:

depicted on said staff are at least five noteheads of substantially different shape, with the shape of each of said at least five noteheads being selected from the group of notehead shapes substantially as shown in FIGS. 9, 10 and 11.

15. The method of claim 6, wherein:

each of said three lines of said second group are evenly spaced a uniform spacing distance from any adjacent of said three lines, and said two lines of said first group are separated by said spacing distance.

* * * * *